United States Patent
Karlsson et al.

(10) Patent No.: US 9,003,051 B2
(45) Date of Patent: *Apr. 7, 2015

(54) CONTENT SERVER MEDIA STREAM MANAGEMENT

(75) Inventors: Kent Karlsson, San Francisco, CA (US); Emil Pettersson, Järfälla (SE); Anders Ödlund, Trollhättan (SE); Mesut Yousseinof, Stockholm (SE); Thomas Matsson, Enköping (SE)

(73) Assignee: MobiTV, Inc., Emeryville, CA (US)

( * ) Notice: Subject to any disclaimer, the term of this patent is extended or adjusted under 35 U.S.C. 154(b) by 589 days.

This patent is subject to a terminal disclaimer.

(21) Appl. No.: 12/101,913

(22) Filed: Apr. 11, 2008

(65) Prior Publication Data

US 2009/0259765 A1   Oct. 15, 2009

(51) Int. Cl.
*G06F 15/16* (2006.01)
*H04L 29/06* (2006.01)
*H04L 29/08* (2006.01)

(52) U.S. Cl.
CPC ............ *H04L 65/60* (2013.01); *H04L 65/4092* (2013.01); *H04L 65/602* (2013.01); *H04L 65/608* (2013.01); *H04L 67/303* (2013.01)

(58) Field of Classification Search
CPC .............................................. H04N 21/23439
USPC .......................... 709/219, 231, 233; 370/503
See application file for complete search history.

(56) References Cited

U.S. PATENT DOCUMENTS

| | | | |
|---|---|---|---|
| 7,796,999 B1* | 9/2010 | Martin et al. | 455/456.1 |
| 2002/0107940 A1* | 8/2002 | Brassil | 709/219 |
| 2005/0183120 A1* | 8/2005 | Jain et al. | 725/46 |
| 2005/0223107 A1* | 10/2005 | Mine et al. | 709/231 |
| 2007/0209005 A1* | 9/2007 | Shaver et al. | 715/733 |
| 2007/0250761 A1* | 10/2007 | Bradley et al. | 715/500.1 |
| 2008/0052414 A1* | 2/2008 | Panigrahi et al. | 709/246 |
| 2008/0062322 A1* | 3/2008 | Dey et al. | 348/589 |
| 2008/0186849 A1* | 8/2008 | Kampmann et al. | 370/232 |
| 2008/0195761 A1* | 8/2008 | Jabri et al. | 709/250 |
| 2008/0267213 A1 | 10/2008 | Deshpande | |
| 2008/0301169 A1* | 12/2008 | Hagihara | 707/102 |
| 2009/0147787 A1* | 6/2009 | Arulambalam et al. | 370/392 |
| 2009/0204719 A1* | 8/2009 | Simongini et al. | 709/231 |
| 2009/0228569 A1 | 9/2009 | Kalmanje et al. | |
| 2009/0265746 A1* | 10/2009 | Halen et al. | 725/109 |

OTHER PUBLICATIONS

Karlsson, et al. "Content Server Media Stream Management," filed Dec. 29, 2008, U.S. Appl. No. 12/345,534.

(Continued)

*Primary Examiner* — Glenford Madamba
(74) *Attorney, Agent, or Firm* — Kwan & Olynick LLP

(57) ABSTRACT

Mechanisms are provided to manage media stream transmissions at a content server. A content server detects that a user on a device such as a mobile device has stopped playing a live media stream. The content server maintains information associating the user with the media stream and time information. When the content server detects that a user wishes to resume playing a media stream, the user can continue viewing the media stream from where stoppage occurred. In many instances, the content server stores many hours of live media stream data and allows a user to select a particular starting point.

21 Claims, 8 Drawing Sheets

(56) References Cited

OTHER PUBLICATIONS

"U.S. Appl. No. 12/345,534, Non Final Office Action mailed Jul. 12, 2010", 21 pgs.

"U.S. Appl. No. 12/345,534, Response filed Oct. 7, 2010 to Non Final Office Action mailed Jul. 12, 2010", 7 pgs.

"U.S. Appl. No. 12/345,534, Final Office Action mailed Dec. 17, 2010", 22 pgs.

"U.S. Appl. No. 12/345,534, Preliminary Amendment filed Mar. 8, 2011", 6 pgs.

"U.S. Appl. No. 12/345,534, Non Final Office Action mailed Mar. 29, 2012", 23 pgs.

"U.S. Appl. No. 12/345,534, Response filed May 31, 2012 to Non Final Office Action mailed Mar. 29, 2012", 6 pgs.

"U.S. Appl. No. 12/345,534, Examiner Interview Summary mailed Mar. 31, 2014".

U.S. Appl. No. 12/345,534, Non Final Office Action mailed Sep. 12, 2013.

"U.S. Appl. No. 12/345,534, Notice of Allowance mailed Apr. 11, 2014".

* cited by examiner

| RTP Packet Stream 301 | | | | | | | | | | | | | | | |
|---|---|---|---|---|---|---|---|---|---|---|---|---|---|---|---|
| Timestamp 303 | 6 | 6 | 6 | 7 | 8 | 9 | 10 | 11 | 11 | 12 | 13 | 14 | 15 | 16 | 17 | 17 |
| Sequence Number 305 | 4303 | 4304 | 4305 | 4306 | 4307 | 4308 | 4309 | 4310 | 4311 | 4312 | 4313 | 4314 | 4315 | 4316 | 4317 | 4318 |
| Marker 307 | 0 | 0 | 0 | 0 | 0 | 0 | 0 | 0 | 0 | 0 | 0 | 0 | 0 | 0 | 0 | 0 |
| Data Frame 309 | I | I | I | P | B | P | P | I | I | P | P | B | P | B | I | I |

Figure 3

| Media Stream Management 501 | | |
|---|---|---|
| User Identifier 511 | Media Stream 513 | Timing Marker 515 |
| User Identifier 521 | Media Stream 523 | Timing Marker 525 |
| User Identifier 531 | Media Stream 533 | Timing Marker 535 |
| User Identifier 541 | Media Stream 543 | Timing Marker 545 |
| User Identifier 551 | Media Stream 553 | Timing Marker 555 |
| User Identifier 561 | Media Stream 563 | Timing Marker 565 |

Figure 5

CONTENT SERVER MEDIA STREAM MANAGEMENT

TECHNICAL FIELD

The present disclosure relates to managing and manipulating media streams.

DESCRIPTION OF RELATED ART

Content servers provide media streams to individual devices using protocols such as the Real-Time Transport Protocol (RTP). A separate session is used to carry each content stream such as a video or audio stream. RTP specifies a standard packet format that is used to carry video and audio data such as Moving Pictures Expert Group (MPEG) video data including MPEG-2 and MPEG-4 video frames. In many instances, multiple frames are included in a single RTP packet. The MPEG frames themselves may be reference frames or may be frames encoded relative to a reference frame.

Conventional techniques and mechanisms allow a content server to transmit a media stream to a client device. However, mechanisms for managing and manipulating the media stream efficiently and effectively are limited. Consequently, it is desirable to provide improved techniques and mechanisms for transmitting media streams from content servers to client devices.

BRIEF DESCRIPTION OF THE DRAWINGS

The disclosure may best be understood by reference to the following description taken in conjunction with the accompanying drawings, which illustrate particular embodiments.

FIG. 3 illustrates one example of an RTP stream.

FIG. 5 illustrates one example of a media stream management table.

DESCRIPTION OF EXAMPLE EMBODIMENTS

Figure 1:
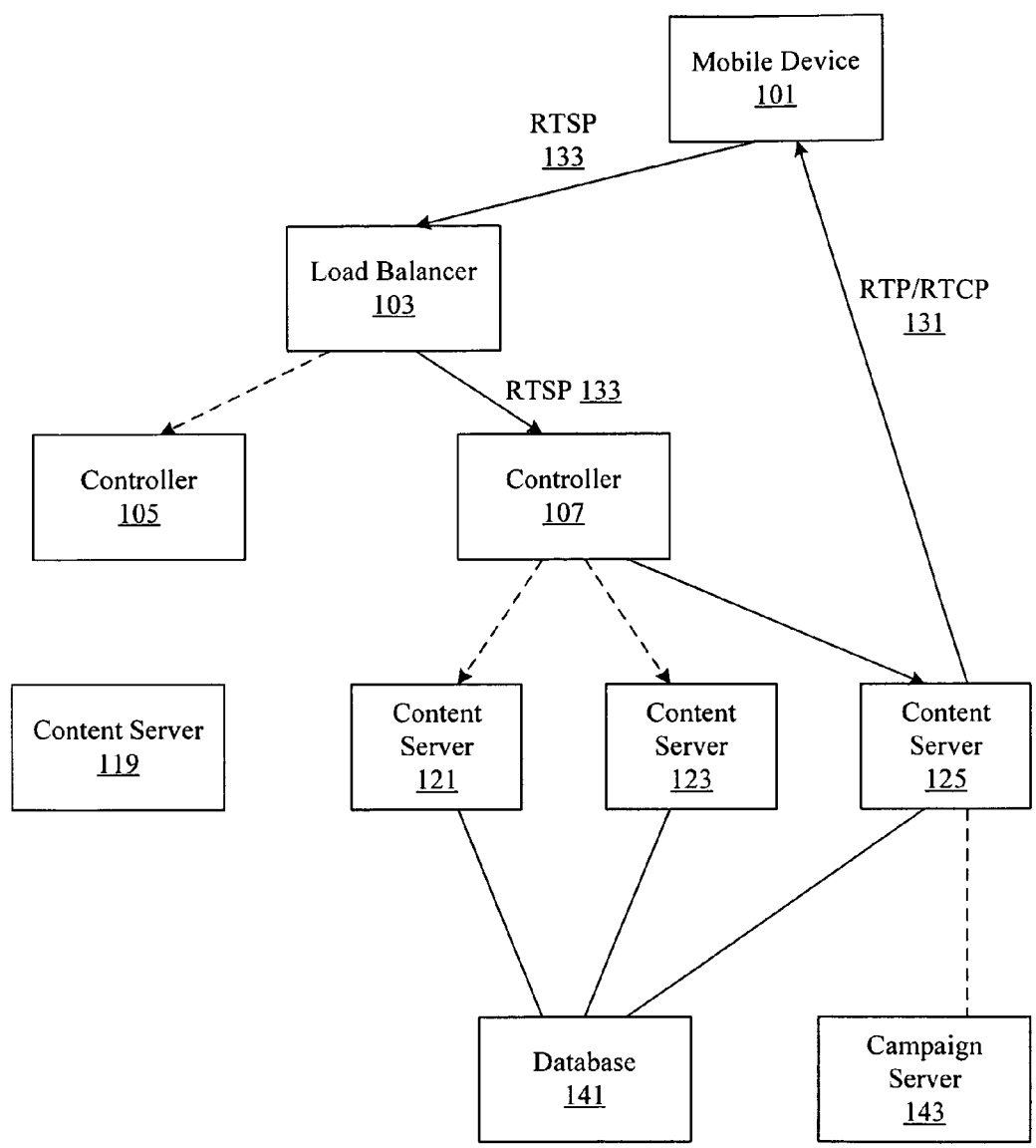
FIG. 1 illustrates an exemplary system for use with embodiments of the present invention.

Reference will now be made in detail to some specific examples of the invention including the best modes contemplated by the inventors for carrying out the invention. Examples of these specific embodiments are illustrated in the accompanying drawings. While the invention is described in conjunction with these specific embodiments, it will be understood that it is not intended to limit the invention to the described embodiments. On the contrary, it is intended to cover alternatives, modifications, and equivalents as may be included within the spirit and scope of the invention as defined by the appended claims.

For example, the techniques of the present invention will be described in the context of the Real-Time Transport Protocol (RTP) and the Real-Time Streaming Protocol (RTSP). However, it should be noted that the techniques of the present invention apply to a variations of RTP and RTSP. In the following description, numerous specific details are set forth in order to provide a thorough understanding of the present invention. Particular example embodiments of the present invention may be implemented without some or all of these specific details. In other instances, well known process operations have not been described in detail in order not to unnecessarily obscure the present invention.

Various techniques and mechanisms of the present invention will sometimes be described in singular form for clarity. However, it should be noted that some embodiments include multiple iterations of a technique or multiple instantiations of a mechanism unless noted otherwise. For example, a system uses a processor in a variety of contexts. However, it will be appreciated that a system can use multiple processors while remaining within the scope of the present invention unless otherwise noted. Furthermore, the techniques and mechanisms of the present invention will sometimes describe a connection between two entities. It should be noted that a connection between two entities does not necessarily mean a direct, unimpeded connection, as a variety of other entities may reside between the two entities. For example, a processor may be connected to memory, but it will be appreciated that a variety of bridges and controllers may reside between the processor and memory. Consequently, a connection does not necessarily mean a direct, unimpeded connection unless otherwise noted.

Overview

Mechanisms are provided to manage media stream transmissions at a content server. A content server detects that a user on a device such as a mobile device has stopped playing a live media stream. The content server maintains information associating the user with the media stream and time information. When the content server detects that a user wishes to resume playing a media stream, the user can continue viewing the media stream from where stoppage occurred. In many instances, the content server stores many hours of live media stream data and allows a user to select a particular starting point.

Example Embodiments

A variety of mechanisms are used to deliver media streams to devices. In particular examples, a client establishes a session such as a Real-Time Streaming Protocol (RTSP) session. A server computer receives a connection for a media stream, establishes a session, and provides a media stream to a client device. The media stream includes packets encapsulating frames such as Moving Pictures Expert Group (MPEG) frames. The MPEG frames themselves may be key frames or differential frames. The specific encapsulation methodology used by the server depends on the type of content, the format of that content, the format of the payload, the application and transmission protocols being used to send the data. After the client device receives the media stream, the client device decapsulates the packets to obtain the MPEG frames and decodes the MPEG frames to obtain the actual media data.

In many instances, a server computer obtains media data from a variety of sources, such as media libraries, cable providers, satellite providers, and processes the media data into MPEG frames such as MPEG-2 or MPEG-4 frames. In particular examples, a server computer may encode six media streams of varying bit rates for a particular channel for distribution to a variety of disparate devices.

A user on a device such as a mobile device obtains a media stream by establishing an RTSP session. According to various embodiments, a user may stop viewing the media stream at some point. In some examples, a user may manually stop viewing a media stream or may want to switch from viewing on a mobile phone to viewing the media stream on a computer or television. In typical implementations, stopping a media stream closes an RTSP session. When a user resumes viewing the media stream, the user may have missed a large portion of a program due to time lapse. A user may have a digital video recorder or a personal video recorder, but the recorder may require configuration. Devices such as mobile devices also do not typically have recording capabilities.

Consequently, the techniques and mechanisms of the present invention provide the user with the ability to resume a media stream at some later time. For example, a user stops viewing a video stream at a particular time. The content server continues to buffer the live media stream and maintains what the user was viewing and when viewing stopped. When a user attempts to reconnect, either on the mobile device or on some other device, the content server can continue sending the media stream where the user left off. In some instances, the content server gives the user the option to play the media stream as a live stream or to play the media stream where the user stopped viewing.

According to various embodiments, the content server buffers thousands of media streams and can allow a user to view media stream content from any starting point still within the content server buffers. The user may be able to request not only a particular channel, but a particular time. A user can watch recorded content without having to configure a recording in advance on all devices including devices that do not have recording capabilities. In particular embodiments, the user can not skip over commercials as the content server manages and stores the media streams.

FIG. 1 is a diagrammatic representation illustrating one example of a system that can use the techniques and mechanisms of the present invention. According to various embodiments, content servers 119, 121, 123, and 125 are configured to provide media content to a mobile device 101 using protocols such as RTP and RTCP. Although a mobile device 101 is shown, it should be recognized that other devices such as set top boxes and computer systems can also be used. In particular examples, the content servers 119, 121, 123, and 125 can themselves establish sessions with mobile devices and stream video and audio content to mobile devices. However, it is recognized that in many instances, a separate controller such as controller 105 or controller 107 can be used to perform session management using a protocol such as RTSP. It is recognized that content servers require the bulk of the processing power and resources used to provide media content mobile devices. Session management itself may include far fewer transactions. Consequently, a controller can handle a far larger number of mobile devices than a content server can. In some examples, a content server can operate simultaneously with thousands of mobile devices, while a controller performing session management can manage millions of mobile devices simultaneously.

By separating out content streaming and session management functions, a controller can select a content server geographically close to a mobile device 101. It is also easier to scale, as content servers and controllers can simply be added as needed without disrupting system operation. A load balancer 103 can provide further efficiency during session management using RTSP 133 by selecting a controller with low latency and high throughput.

According to various embodiments, the content servers 119, 121, 123, and 125 have access to a campaign server 143. The campaign server 143 provides profile information for various mobile devices 101. In some examples, the campaign server 143 is itself a content server or a controller. The campaign server 143 can receive information from external sources about devices such as mobile device 101. The information can be profile information associated with various users of the mobile device including interests and background. The campaign server 143 can also monitor the activity of various devices to gather information about the devices. The content servers 119, 121, 123, and 125 can obtain information about the various devices from the campaign server 143. In particular examples, a content server 125 uses the campaign server 143 to determine what type of media clips a user on a mobile device 101 would be interested in viewing.

According to various embodiments, the content servers 119, 121, 123, and 125 are also receiving media streams from content providers such as satellite providers or cable providers and sending the streams to devices using RTP 131. In particular examples, content servers 119, 121, 123, and 125 access database 141 to obtain desired content that can be used to supplement streams from satellite and cable providers. In one example, a mobile device 101 requests a particular stream. A controller 107 establishes a session with the mobile device 101 and the content server 125 begins streaming the content to the mobile device 101 using RTP 131. In particular examples, the content server 125 obtains profile information from campaign server 143.

In some examples, the content server 125 can also obtain profile information from other sources, such as from the mobile device 101 itself. Using the profile information, the content server can determine whether a client device would support a burst of data. For example, the content server could determine that the client device has a particular buffer size and reports when the buffer is low or empty. When the client device supports buffer bursts, the content server can transmit available data at a higher bit rate to the client device when the client buffer is low or empty. In some instances, a content server buffer for a particular channel will be empty and nothing can be transmitted to the client. However, if the content server buffer for the particular channel has data available, a burst of data can be transmitted to replenish the client buffer. In a particular example, 8 seconds of video data is transmitted in a short amount of time. Extra packets can simply be transmitted. However, a lower quality stream selected from the same channel or from a database can also be transmitted to replenish the client buffer.

Figure 2:
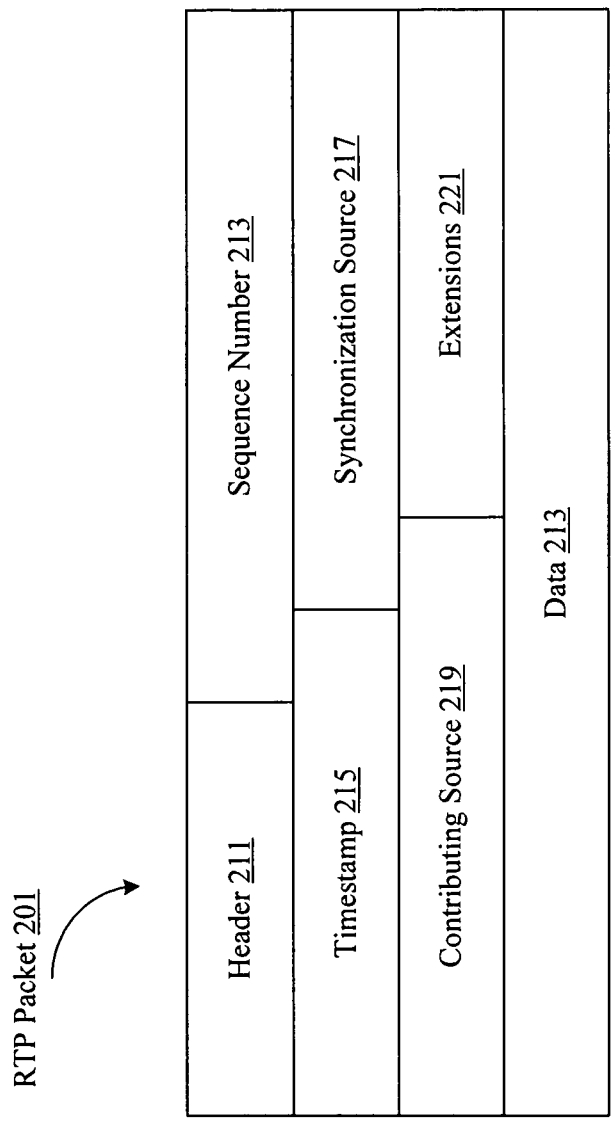
FIG. 2 illustrates one example of a Real-Time Transport Protocol (RTP) packet.

FIG. 2 illustrates one example of an RTP packet. An RTP packet 201 includes a header 211. According to various embodiments, the header 211 includes information such as the version number, amount of padding, protocol extensions, application level, payload format, etc. The RTP packet 201 also includes a sequence number 213. Client applications receiving RTP packets expect that the sequence numbers for received packets be unique. If different packets have the same sequence number, erroneous operation can occur. RTP packets also have a timestamp 215 that allows jitter and synchronization calculations. Fields 217 and 219 identify the synchronization source and the contributing source. Extensions are provided in field 221.

According to various embodiments, data 231 holds actual media data such as MPEG frames. In some examples, a single RTP packet 201 holds a single MPEG frame. In many instances, many RTP packets are required to hold a single MPEG frame. In instances where multiple RTP packets are required for a single MPEG frame, the sequence numbers change across RTP packets while the timestamp 215 remains the same across the different RTP packets. Different MPEG frames include I-frames, P-frames, and B-frames. I-frames are intraframes coded completely by itself. P-frames are predicted frames which require information from a previous I-frame or P-frame. B-frames are bi-directionally predicted frames that require information from surrounding I-frames and P-frames.

Because different MPEG frames require different numbers of RTP packets for transmission, two different streams of the same time duration may require different numbers of RTP packets for transmission. Simply replacing a clip with another clip would not work, as the clips may have different numbers of RTP packets and having different impacts on the sequence numbers of subsequent packets.

FIG. 3 illustrates one example of an RTP packet stream. An RTP packet stream 301 includes individual packets having a variety of fields and payload data. According to various embodiments, the fields include a timestamp 303, sequence 505, marker 307, etc. The packets also include payload data 309 holding MPEG frames such as I, P, and B-frames. Timestamps for different packets may be the same. In particular examples, several packets carrying portions of the same I-frame have the same time stamp. However, sequence numbers are different for each packet. Marker bits 307 can be used for different purposes, such as signaling the starting point of an advertisement.

According to various embodiments, packets with sequence numbers 4303, 4304, and 4305 carrying potions of the same I-frame and have the same timestamp of 6. Packets with sequence numbers 4306, 4307, 4308, and 4309 carry P, B, P, and P-frames and have timestamps of 7, 8, 9, and 10 respectively. Packets with sequence numbers 4310 and 4311 carry different portions of the same I-frame and both have the same timestamp of 11. Packets with sequence numbers 4312, 4313, 4314, 4315, and 4316 carry P, P, B, P, and B-frames respectively and have timestamps 12, 13, 14, 15, and 16. It should be noted that the timestamps shown in FIG. 3 are merely representational. Actual timestamps can be computed using a variety of mechanisms.

For many audio encodings, the timestamp is incremented by the packetization interval multiplied by the sampling rate. For example, for audio packets having 20 ms of audio sampled at 8,000 Hz, the timestamp for each block of audio increases by 160. The actual sampling rate may also differ slightly from this nominal rate. For many video encodings, the timestamps generated depend on whether the application can determine the frame number. If the application can determine the frame number, the timestamp is governed by the nominal frame rate. Thus, for a 30 f/s video, timestamps would increase by 3,000 for each frame. If a frame is transmitted as several RTP packets, these packets would all bear the same timestamp. If the frame number cannot be determined or if frames are sampled a periodically, as is typically the case for software codecs, the timestamp may be computed from the system clock While the timestamp is used by a receiver to place the incoming media data in the correct timing order and provide playout delay compensation, the sequence numbers are used to detect loss. Sequence numbers increase by one for each RTP packet transmitted, timestamps increase by the time "covered" by a packet. For video formats where a video frame is split across several RTP packets, several packets may have the same timestamp. For example, packets with sequence numbers 4317 and 4318 have the same timestamp 17 and carry portions of the same I-frame.

Figure 4:
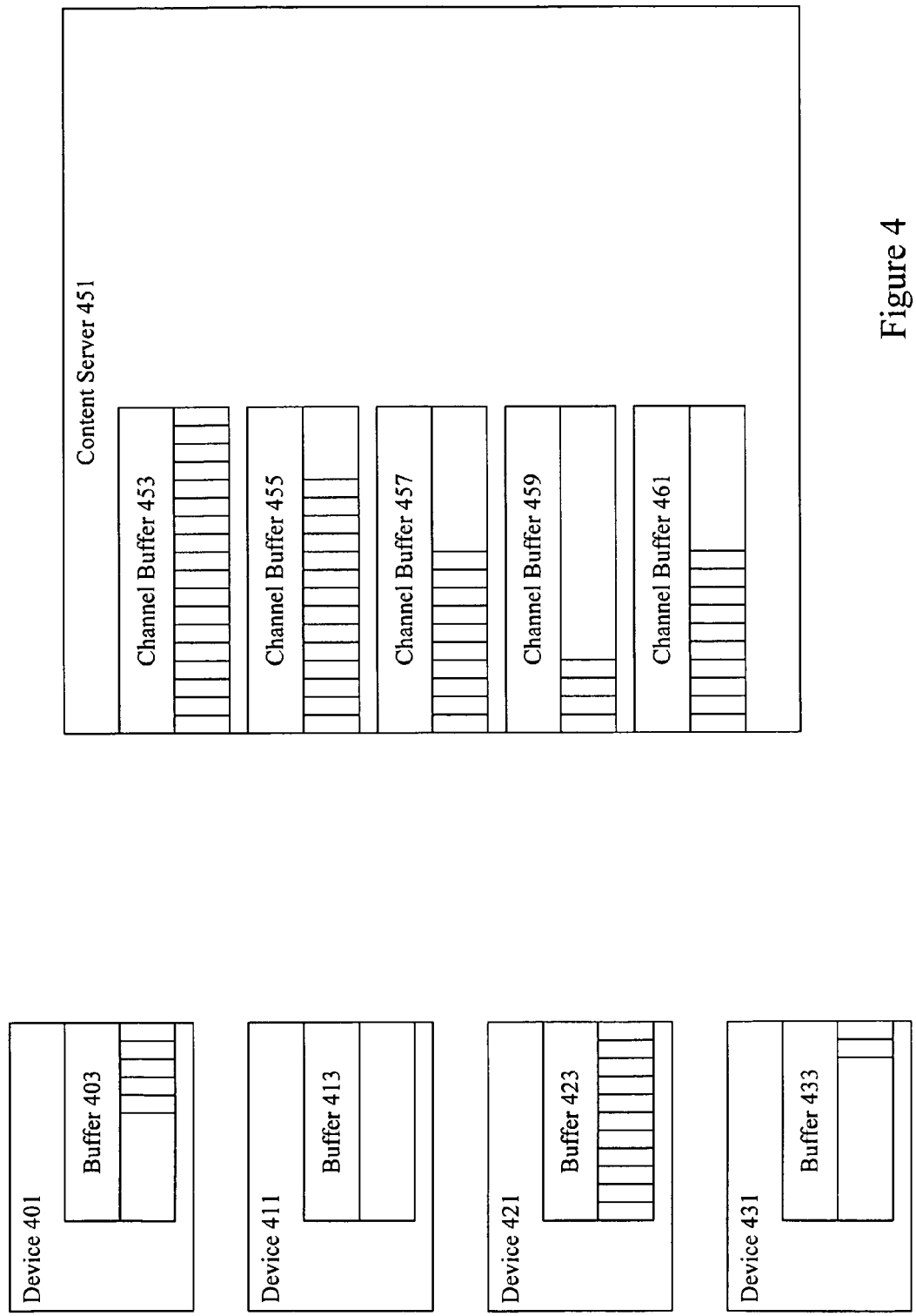
FIG. 4 illustrates one example of content server having channel buffers.

FIG. 4 illustrates one example of content server buffers. According to various embodiments, devices 401, 411, 421, and 431 have individual buffers 403, 413, 423, and 433. Content server 451 includes channel buffers 453, 455, 457, 459, and 461. In particular embodiments, a content server 451 detects that a device has little or no data remaining in a buffer. A device such as a mobile device may have little or no data in a buffer when network conditions cause transmission delays and drop packets or when a device initially requests a media stream. To improve user experience, a content server 451 bursts available data for a requested stream to a device 411 having an low or empty buffer. In some examples, the content server 451 transmits data from channel buffer 455 to device 411 at double the usual transmission bit rate for a fixed number of seconds.

In other examples, the content server 451 transmits data from a low quality stream in channel buffer 453 to device 411. Transmitting a lower quality stream allows a buffer to be filled while maintaining the same transmission bit rate. For example, a stream in channel buffer 453 may be a 50 mbps stream while a stream in channel buffer 455 may be a 100 mbps stream. More frames from the lower quality stream can be transmitted to allow the device 411 to resume playback with decreased delay.

According to various embodiments, content server buffers may or may not be prefilled. In some examples, once a media stream has been requested, the corresponding channel buffer is filled at the content server. However, channel buffers corresponding to media streams not yet requested are typically not prefilled or prewarmed. Playback can be delayed while the content server channel buffers are filled. Consequently, the techniques and mechanisms of the present invention contemplate prefilling channel buffers. According to various embodiments, the content server channel buffers are prefilled using live streams from cable and satellite providers and continually refreshed with the most recent streaming data. In some instances, all channel buffers are prefilled. In other instances, selected channel buffers are prefilled and refreshed using satellite and cable media streams.

FIG. 5 illustrates one example of a mechanism for maintaining timing information. According to various embodiments, a content server maintains information about the program a user last watched and when the user stopped watching the program. In particular embodiments, a media stream management database 501 holds user identifiers 511, 521, 531, 541, 551, and 561. The user identifiers may correspond to specific subscribers, individuals, or devices. In particular embodiments, the media stream management database 501 also holds information about the media stream being viewed by a particular user. The media stream fields 513, 523, 533, 543, 553, and 563 identify particular channels or particular media streams that a user stopped viewing. Timing markers 515, 525, 535, 545, 555, and 565 identify points in time where viewing stopped. In some instances, the timing markers correspond to time information included in RTP packets.

According to various embodiments, a content server detects a stoppage event, such as a session close message, a session break message, or other disruption in the transmission of the stream to a device, and marks the time when the viewing stopped. In some examples, the stoppage point is recorded as being a few seconds before an actual stoppage event is detected, to allow some possible overlap when a user resumes viewing or listening to a stream.

Figure 6:
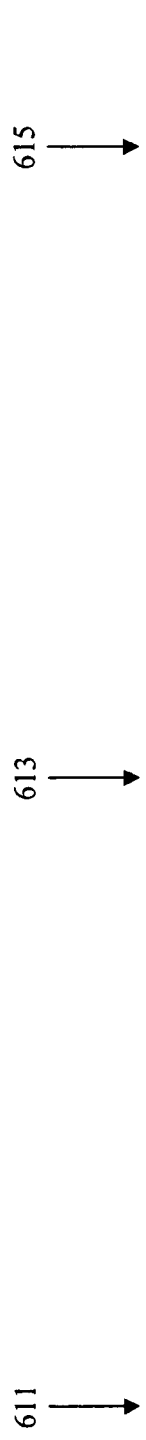
FIG. 6 illustrates example of entry points in a media stream.

FIG. 6 illustrates various starting points at which a media stream can resume in an RTP packet stream. An RTP packet stream 601 includes individual packets having a variety of fields and payload data. According to various embodiments, the fields include a timestamp 603, sequence 605, marker 607, etc. The packets also include payload data 609 holding MPEG frames such as I, P, and B-frames. Timestamps for different packets may be the same. In particular examples, several packets carrying portions of the same I-frame have the same time stamp. However, sequence numbers are different for each packet. Marker bits 607 can be used for different purposes, such as signaling the starting point of an advertisement.

According to various embodiments, packets with sequence numbers 4303, 4304, and 4305 carrying potions of the same I-frame and have the same timestamp of 6. Packets with sequence numbers 4306, 4307, 4308, and 4309 carry P, B, P, and P-frames and have timestamps of 7, 8, 9, and 10 respectively. Packets with sequence numbers 4310 and 4311 carry different portions of the same I-frame and both have the same timestamp of 11. Packets with sequence numbers 4312, 4313, 4314, 4315, and 4316 carry P, P, B, P, and B-frames respectively and have timestamps 12, 13, 14, 15, and 16. It should be noted that the timestamps shown in FIG. 6 are merely representational. Actual timestamps can be computed using a variety of mechanisms.

According to various embodiments, positions 611, 613, and 615 indicate points at which a media stream may be resumed. In particular embodiments, a media stream resumes at an I-frame to provide a device with enough information to generate a complete picture immediately, instead of providing a P-frame or a B-frame with only differential information insufficient to generate a complete picture. Positions 611, 613, and 615 or corresponding timestamps 6, 11, and 17 may be associated with a user device and maintained at a content server. According to various embodiments, possible starting positions may include times many hours or many days in the past, depending on the amount of buffer space at a content server.

Figure 7:
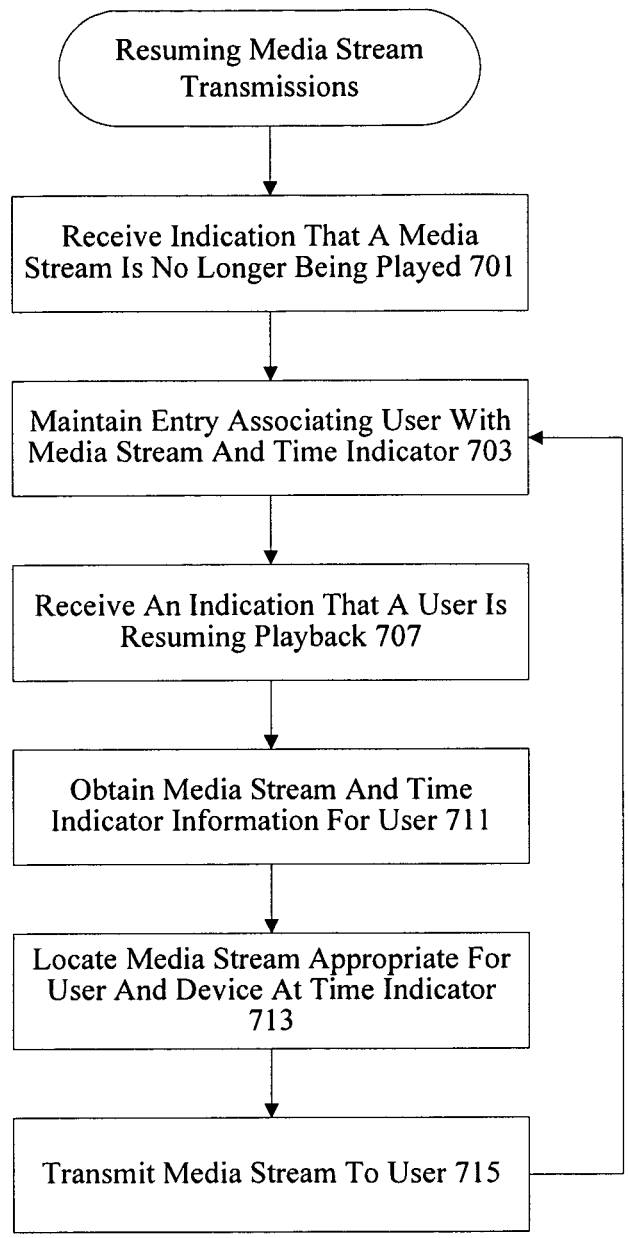
FIG. 7 illustrates one example of a technique for resuming media transmissions.

FIG. 7 illustrates one technique for performing for resuming media stream transmissions. In many conventional implementations, when a media stream session is broken for any reason, the user must reestablish the session and the media stream transmissions resume at a current point in time. In some examples, a user may miss important content simply by switching devices or losing wireless reception. Consequently, the techniques of the present invention allow a user to resume a media stream where the stream was stopped. In some examples, a user can elect whether to play a stream as a live stream or play a stream where the stream was stopped. In still other examples, a user can elect a specific time to view a stream.

According to various embodiments, an indication that a media stream is no longer being played is received at 701. In particular embodiments, the indication is a session break message. In other embodiments, the indication a specialized command or some other termination of service. At 703, an entry is maintained associating the user with the media stream being viewed and a time indicator. According to various embodiments, a device identifier is maintained instead of a user identifier. Channels and quality levels may also be optionally maintained. At 707, an indication is received that a user is resuming playback. At 711, the media stream identifier and time indicator information for the user is obtained. At 713, the media stream appropriate for the user and device is located at the particular time indicator. According to various embodiments, a high bandwidth media stream is obtained if the user is viewing the media stream using large screen device connected to a high speed network. In particular embodiments, a low bandwidth media stream is obtained if the user is viewing the media stream using a small screen device connected to a bandwidth limited network. At 715, the media stream is transmitted to the user.

Figure 8:
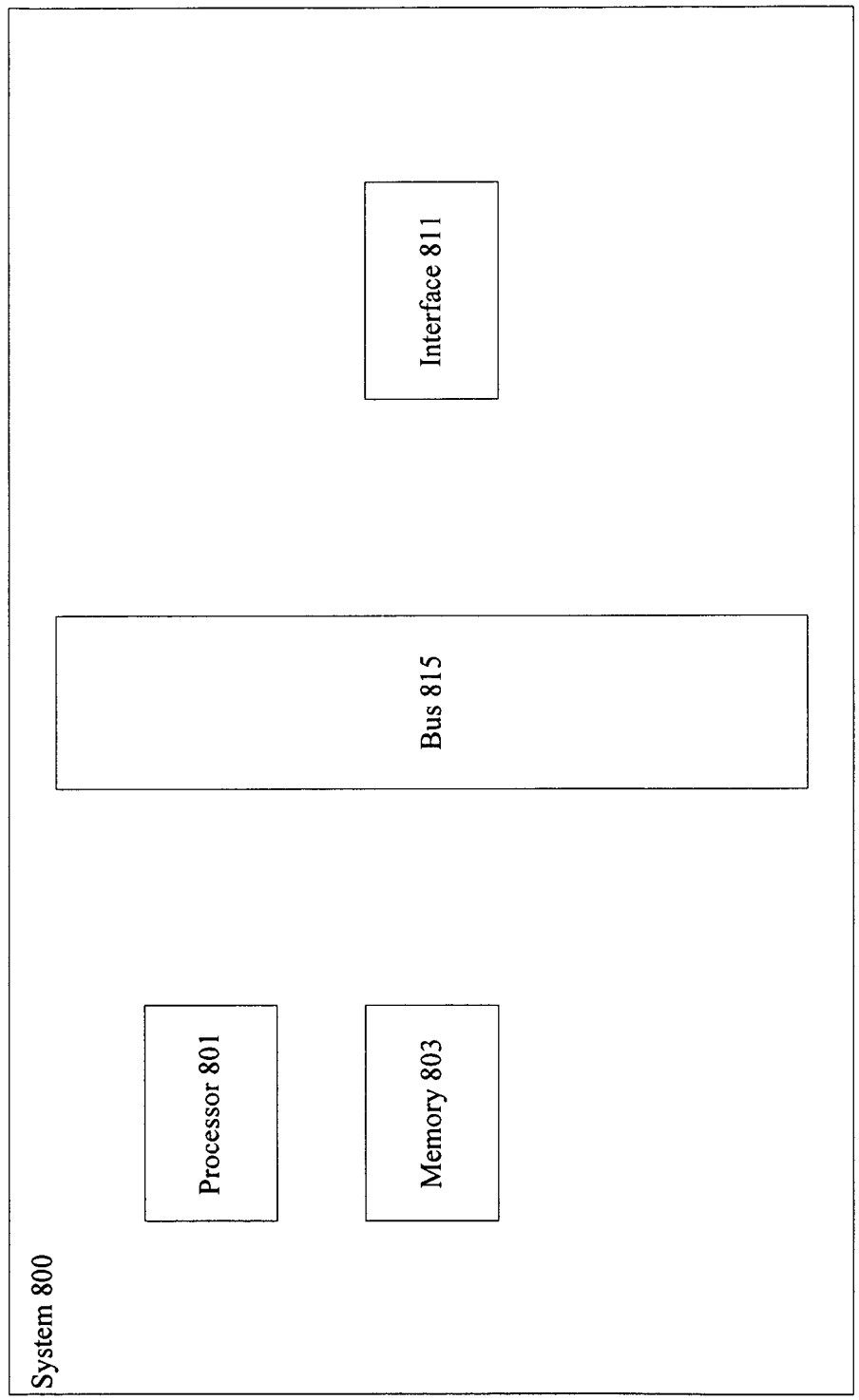
FIG. 8 illustrates one example of a system for processing media streams.

FIG. 8 illustrates one example of a content server. According to particular embodiments, a system 800 suitable for implementing particular embodiments of the present invention includes a processor 801, a memory 803, an interface 811, and a bus 815 (e.g., a PCI bus or other interconnection fabric) and operates as a streaming server. When acting under the control of appropriate software or firmware, the processor 801 is responsible for modifying and transmitting live media data to a client. Various specially configured devices can also be used in place of a processor 801 or in addition to processor 801. The interface 811 is typically configured to end and receive data packets or data segments over a network.

Particular examples of interfaces supports include Ethernet interfaces, frame relay interfaces, cable interfaces, DSL interfaces, token ring interfaces, and the like. In addition, various very high-speed interfaces may be provided such as fast Ethernet interfaces, Gigabit Ethernet interfaces, ATM interfaces, HSSI interfaces, POS interfaces, FDDI interfaces and the like. Generally, these interfaces may include ports appropriate for communication with the appropriate media. In some cases, they may also include an independent processor and, in some instances, volatile RAM. The independent processors may control such communications intensive tasks as packet switching, media control and management.

According to various embodiments, the system 800 is a content server that also includes a transceiver, streaming buffers, and a program guide database. The content server may also be associated with subscription management, logging and report generation, and monitoring capabilities. In particular embodiments, functionality for allowing operation with mobile devices such as cellular phones operating in a particular cellular network and providing subscription management. According to various embodiments, an authentication module verifies the identity of devices including mobile devices. A logging and report generation module tracks mobile device requests and associated responses. A monitor system allows an administrator to view usage patterns and system availability. According to various embodiments, the content server 891 handles requests and responses for media content related transactions while a separate streaming server provides the actual media streams.

Although a particular content server 891 is described, it should be recognized that a variety of alternative configurations are possible. For example, some modules such as a report and logging module 853 and a monitor 851 may not be needed on every server. Alternatively, the modules may be implemented on another device connected to the server. In another example, the server 891 may not include an interface to an abstract buy engine and may in fact include the abstract buy engine itself. A variety of configurations are possible.

In the foregoing specification, the invention has been described with reference to specific embodiments. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of invention.

The invention claimed is:

1. A method, comprising:
   maintaining information at a content server associating a user with a media stream and time information, the content server operable to provide a plurality of live media streams to the user, the plurality of live media streams maintained in a plurality of channel buffers, wherein the plurality of channel buffers are prefilled and refreshed using satellite and cable media streams;
   receiving a request for the media stream from the user;

determining a user device and bandwidth availability associated with the request;

selecting a particular version of the media stream using information about the user device, including user device buffer size and user device buffer level, and bandwidth availability;

transmitting the particular version of the media stream to the user beginning with packets selected using the time information maintained at the content server.

2. The method of claim 1, wherein the request is a command to resume playback.

3. The method of claim 1, wherein the request is a command to establish a session.

4. The method of claim 1, wherein information at the content server is maintained after an indication that the media stream is no longer being played is received.

5. The method of claim 4, wherein the media stream is no longer being played when a session is stopped.

6. The method of claim 1, wherein the user requests the media stream from a mobile device.

7. The method of claim 1, wherein the user requests the media stream from a set top box.

8. The method of claim 1, wherein the user accesses the media stream using a device.

9. The method of claim 1, wherein the device uses the timing information and sequence number information to decode the media stream for playback.

10. The method of claim 1, wherein the device receives the plurality of packets in order based on sequence number information.

11. The method of claim 1, wherein the plurality of live media streams are buffered in a plurality of channel buffers.

12. The method of claim 1, wherein the live media stream is a Real-Time Transport Protocol (RTP) stream.

13. The method of claim 1, wherein the content server is connected over a network to a controller operable to establish a session with the device using a Real-Time Streaming Protocol (RTSP).

14. The method of claim 1, wherein the live media stream comprises a plurality of packets holding I-frames, P-frames, and B-frames.

15. A system, comprising:
a processor operable to maintain information at a content server associating a user with a media stream and time information, the processor further operable to provide a plurality of live media streams to the user, the plurality of live media streams maintained in a plurality of channel buffers, wherein the plurality of channel buffers are prefilled and refreshed using satellite and cable media streams;

an interface operable to receive a request for the media stream from the user and transmit the media stream to the user beginning with packets selected using the time information maintained at the content server, wherein a particular version of the media stream transmitted to the user is selected using user device information, including user device buffer size and user device buffer level, and bandwidth availability information associated with the request.

16. The system of claim 15, wherein the request is a command to resume playback.

17. The system of claim 15, wherein the request is a command to establish a session.

18. The system of claim 15, wherein information at the content server is maintained after an indication that the media stream is no longer being played is received.

19. The system of claim 18, wherein the media stream is no longer being played when a session is stopped.

20. The system of claim 15, wherein the user requests the media stream from a mobile device.

21. A method, comprising:
maintaining information at a content server associating a user with a media stream and time information, the content server operable to provide a plurality of live media streams to the user, the plurality of live media streams maintained in a plurality of channel buffers, wherein the plurality of channel buffers are prefilled and refreshed using satellite and cable media streams;

receiving a request for the media stream from the user;

determining a user device, including user device buffer size and user device buffer level, and bandwidth availability associated with the request;

selecting a particular version of the media stream using information about the user device and bandwidth availability;

selecting an I-frame corresponding to the time information maintained at the content server, the I-frame included in the particular version of the media stream;

transmitting the particular version of the media stream beginning at the I-frame corresponding to the time information.

* * * * *